United States Patent
Reitz et al.

(10) Patent No.: US 10,368,193 B2
(45) Date of Patent: Jul. 30, 2019

(54) TECHNIQUES FOR SHARING A DEVICE LOCATION VIA A MESSAGING SYSTEM

(71) Applicant: Facebook, Inc., Menlo Park, CA (US)

(72) Inventors: Benoît Charles Henri Reitz, London (GB); Menahem Dan Fedida, London (GB); Felix Leupold, London (GB)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/429,770

(22) Filed: Feb. 10, 2017

(65) Prior Publication Data

US 2018/0234795 A1 Aug. 16, 2018

(51) Int. Cl.
| | | |
|---|---|---|
| H04W 4/02 | (2018.01) | |
| H04W 4/12 | (2009.01) | |
| H04L 12/58 | (2006.01) | |
| H04L 29/06 | (2006.01) | |
| H04L 29/08 | (2006.01) | |

(52) U.S. Cl.
CPC ............ *H04W 4/023* (2013.01); *H04L 51/20* (2013.01); *H04L 51/32* (2013.01); *H04L 63/10* (2013.01); *H04L 67/18* (2013.01); *H04W 4/12* (2013.01); *H04L 69/28* (2013.01)

(58) Field of Classification Search
CPC ........ H04W 4/02; H04W 12/06; H04W 64/00
See application file for complete search history.

(56) References Cited

U.S. PATENT DOCUMENTS

| | | | | |
|---|---|---|---|---|
| 7,412,400 | B1* | 8/2008 | Bhela | G06Q 30/02 705/1.1 |
| 2007/0105565 | A1* | 5/2007 | Enzmann | H04L 63/101 455/456.1 |
| 2008/0133730 | A1* | 6/2008 | Park | G01C 21/28 709/223 |
| 2015/0350262 | A1* | 12/2015 | Rainisto | H04L 43/16 709/204 |
| 2016/0014561 | A1* | 1/2016 | Inzer | H04W 4/021 455/456.1 |
| 2016/0239619 | A1* | 8/2016 | Abou-Hawili | G16H 40/20 |
| 2017/0026796 | A1* | 1/2017 | Pai | H04W 4/02 |
| 2017/0034085 | A1* | 2/2017 | Bijor | H04L 51/046 |

OTHER PUBLICATIONS

Nat ("Google's new Trusted Contacts app lets you share your location during emergencies"), The Verge, Dec. 5, 2016.*
"Google Trusted Contacts", retrieved from <https://contacts.google.com/trustedcontacts>, Dec. 5, 2016, 6 pages (author unknown).

* cited by examiner

*Primary Examiner* — Dung Hong

(57) ABSTRACT

A computer-implemented method may include receiving, in a messaging client executing on a first client device, a location request from a second client device; determining whether the second client device is authorized to send the location request to the first client device; starting a timer in response to receiving the location request when the second client device is authorized; and sending a location of the first client device to the second client device when the timer expires. Other embodiments are described and claimed.

18 Claims, 16 Drawing Sheets

TECHNIQUES FOR SHARING A DEVICE LOCATION VIA A MESSAGING SYSTEM

BACKGROUND

Interpersonal communication via mobile devices such as smart phones, tablets and personal computers has become almost ubiquitous. The communication may take place in various forms, such as text messaging, telephone calls, electronic mail messaging, instant messaging, video chatting or conferencing, and so forth. In some cases, communication between users may be interrupted because one of the users is in danger, ill, or otherwise unable to communicate. While the user's device may know its location, the user may not be able to communicate that location to someone in a position to help the user. It is with respect to these and other considerations that the present improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments provide techniques for sharing a device location via a messaging system. Some embodiments are particularly directed to techniques for sharing a device location automatically with an authorized recipient in response to a location request, without the device user's input at the time of the request within a messaging application.

In one embodiment, for example, a computer-implemented method may include receiving, in a messaging client executing on a first client device, a location request from a second client device; determining whether the second client device is authorized to send the location request to the first client device; starting a timer in response to receiving the location request when the second client device is authorized; and sending a location of the first client device to the second client device when the timer expires. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
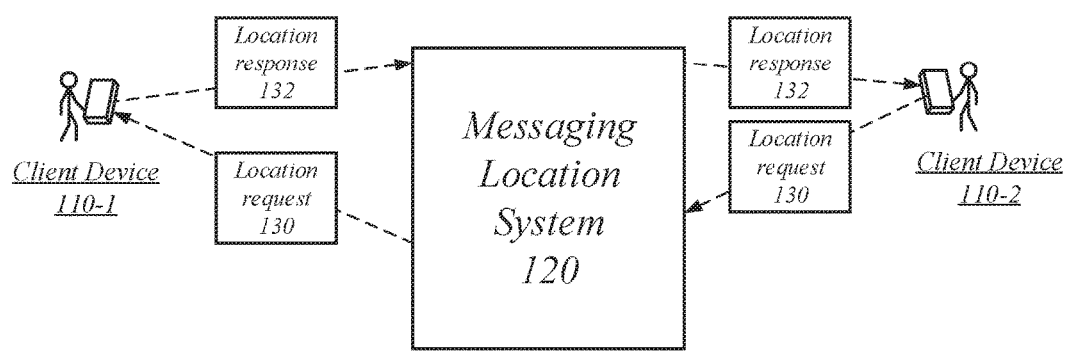
FIG. 1 illustrates an embodiment of an execution system for a communication system.

Various embodiments are generally directed to techniques for sharing a device location via a messaging system. Some embodiments are particularly directed to techniques for sharing a device location automatically with an authorized recipient in response to a location request, without the device user's input at the time of the request within a messaging application.

It is increasingly possible to share one's location via a personal mobile device, for example, by "checking in" to a location or a business within a social networking application, or sharing a location with friends or family members through other applications. Not all users may wish to broadcast their location however. In emergency situations, a person who does not share their location may be at a disadvantage because, while their device may "know" where they are, there is no permission or mechanism to share that information with another person in a position to help.

Accordingly, embodiments presented herein provide methods for using an existing messaging application to send and receive location requests and location information automatically to trusted users, in some cases, without needing any input from the user at the time of the location request. Once a trusted relationship is established, the trusted recipient may request the location of the user and may receive it if the receiving user does nothing to prevent the location response. So if a user is, for example, unconscious due to an accident or a crime, the location of their device may be sent, in response to a location request by a trusted friend, if the incapacitated user cannot respond. The location request and response can take place within a messaging application, without requiring the user to install a separate application for that purpose.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a communication system 100 for using a messaging system to request and receive location information among users and client devices of the system. In one embodiment, the system 100 may comprise a computer-implemented system 100 having a client device 110-1 operated by a first user, a client device 110-2 operated by a second user, and a messaging location system 120, each comprising one or more components. Although the system 100 shown in FIG. 1 has a limited number of elements in a certain topology, it may be appreciated that the system 100 may include more or fewer elements in alternate topologies as desired for a given implementation.

The system 100 may include a messaging location system 120. The messaging location system 120 may coordinate the exchange of messages between two or more participants such as client devices 110-1 and 110-2. The messaging location system 120 may pass the location request 130 through to the client device 110-1, or may perform some authorization operations before sending the location request 130 to the client device 110-1.

As shown in FIG. 1, the users may be communicating by exchanging messages between client devices 110-1, 110-2.

At some point, one user may send a location request 130, e.g. from the client device 110-2, to the other user at the client device 110-1. For example, the user of client device 110-2 may be concerned that the user of the client device 110-1 is not responding to other messages sent through the messaging location system 120, or to telephone calls placed to the client device 110-1, and may request the location of the client device 110-1. The client device 110-1 may send a location response 132 back to the requesting client device 110-2. The location response 132 may be sent, in some embodiments, only when the client device 110-2, or its user, are authorized to send the location request 130. In some embodiments, the location response 132 may be sent automatically, for example, after expiration of a timer, or when the user of the client device 110-1 explicitly allows the location response 132 to be sent, e.g. via a control directive on a user interface element.

A client device 110 may be any electronic device capable of, at least, receiving audio data and/or recording audio data from a microphone, outputting audio data to the sender, and communicating with other devices to exchange data and instructions over a network. The client device 110 may communicate with other devices using wireless transmissions to exchange network traffic. Exchanging network traffic, such as may be included in the exchange of location request 130 and location response 132, may comprise transmitting and receiving network traffic via a network interface controller (NIC). A NIC comprises a hardware component connecting a computer device, such as client device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The client device 110 may perform various operations using network data accessed over a network. The client device 110 may access a cellular system using cellular signals (not shown). The client device 110 may access one or more Wi-Fi access points using Wi-Fi signals (not shown).

Figure 2:
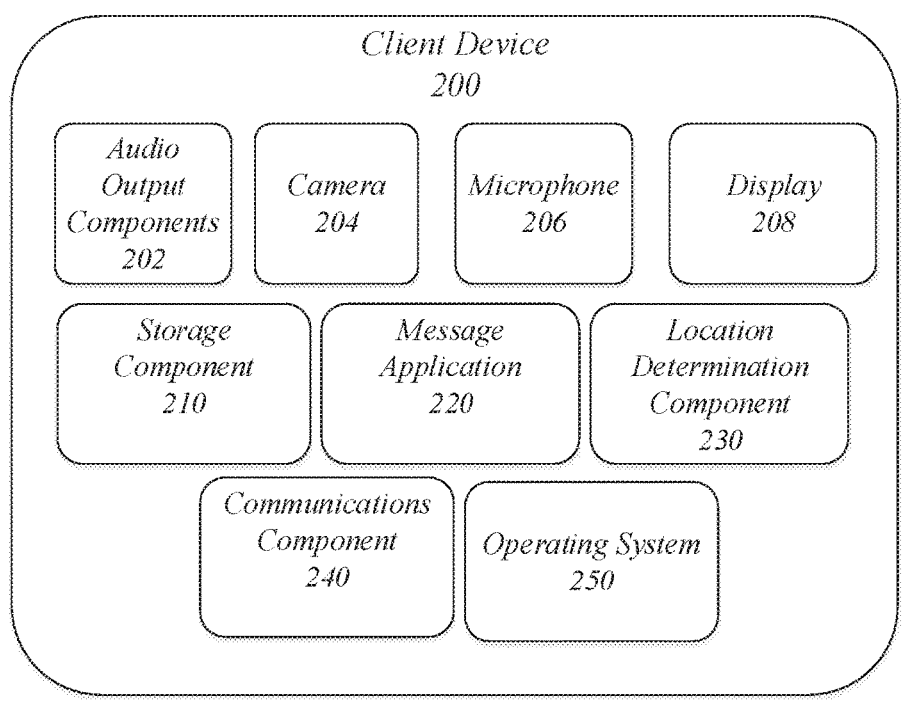
FIG. 2 illustrates an embodiment of a client device for the system of FIG. 1.

FIG. 2 illustrates an embodiment of a client device 200 for the system of FIG. 1. The client device 200 may be an embodiment of client device 110. The client device 200 may include various hardware components and software components. The hardware components may include various audio output components 202, a camera 204, a microphone 206, and a display component 208. Other hardware components may also be included, such as various other input components, e.g. a keyboard or keypad, as well as a global positioning system (GPS) component, an altimeter, and so forth.

The audio output components 202 may include any components operative to output sound waves, such as an earpiece speaker, a loudspeaker, and/or an audio-out connection. The audio output components 202 may include hardware and/or software that converts between analog and digital sound data.

The camera 204 may be a camera integrated into the client device 200 that can take digital photographs through a lens and store the digital photos. The camera 204 may also operate as a video camera that can record video data for storage and/or transmission during a video call.

The microphone 206 may be any device capable of receiving sound waves, e.g. spoken by a human operator, and converting the received sound waves into electrical signals and/or data that can be stored and transmitted to other devices. The microphone 206 may be integrated into the client device 200, or may be an external microphone coupled to the client device 200 wirelessly or through an external wired connection. The microphone 206 may be for example, a component of a head-set, earpiece, or other hands-free communication device that communicates with the client device 200 via a short-range signal technology such as BLUETOOTH® technology. The embodiments are not limited to this example.

The display component 208 may include any interface components capable of presenting visual information to the operator of the client device 200, such as, but not limited to, a screen for visual output including image or video data received as part of a message communication, e.g. messages and a location request 130.

The client device 200 may further include a storage component 210 in the form of one or more computer-readable storage media capable of storing data and instructions for the functions of software, such as a message application 220, and an operating system 250. As used herein, "computer-readable storage medium" is not intended to include carrier waves, or propagating electromagnetic or optical signals.

The client device 200 may include various software components, such as a message application 220. The message application 220 may comprise instructions that when executed by a processing circuit (not shown) cause the client device 200 to perform the operations of the message application 220 as will be described herein. Generally, the message application 220 may be provided on the client device 200 at the time of purchase, or may installed by the sender, and may enable the creation, communication, and playback of communication in a variety of formats, including, but not limited to, real-time audio, audio messages, text, real-time video, and video recordings.

The message application 220 may be software and/or a combination of software and hardware operating on any electronic device capable of sending and receiving messages, including a location request 130 and a location response 132 to and from the client device 200.

The message application 220 may allow a user to communicate with others, e.g. with other users, by sending and receiving messages from one client device to another. The message application 220 may be, for example, and without limitation, an electronic mail application, a short-message-service (SMS) message application, a multimedia-message-service (MMS) message application, a group communication application, a telephone voicemail system application, a video-communication application, and so forth. The message application 220 may be a message application that provides multiple modes of communication, including but not limited to, alphanumeric text, real-time voice calls, real-time video calls, multimedia messages, data representing special effects, and so forth. The message application 220 may be a social network application that allows its members to communicate with messages. The message application 220 may accept an address for a recipient, such as an e-mail address, a chat handle, a telephone number, a user name within a social network service, and so forth.

The client device 200 may include a location determination component 230. The location determination component 230 may include software and/or hardware elements that determine a physical location of the client device 200. The location determination component 230 may determine the location in a variety of ways, for example, using a GPS component, proximity to a WiFi base station having a known location and range, proximity to one or more cellular service transmitters having known locations and ranges, and so forth.

The client device 200 may include a communications component 240. The communications component 240 may include one or more hardware and/or software components that allow the transmission and receiving of signals by the client device 200. The communications component 240 may include the hardware and/or instructions to communicate on a data network, such as over a long-term evolution (LTE) network; a shorter-range network, such as by Wi-Fi or by BLUETOOTH; a cellular telephone network; and/or a peer-to-peer network.

Figure 3:
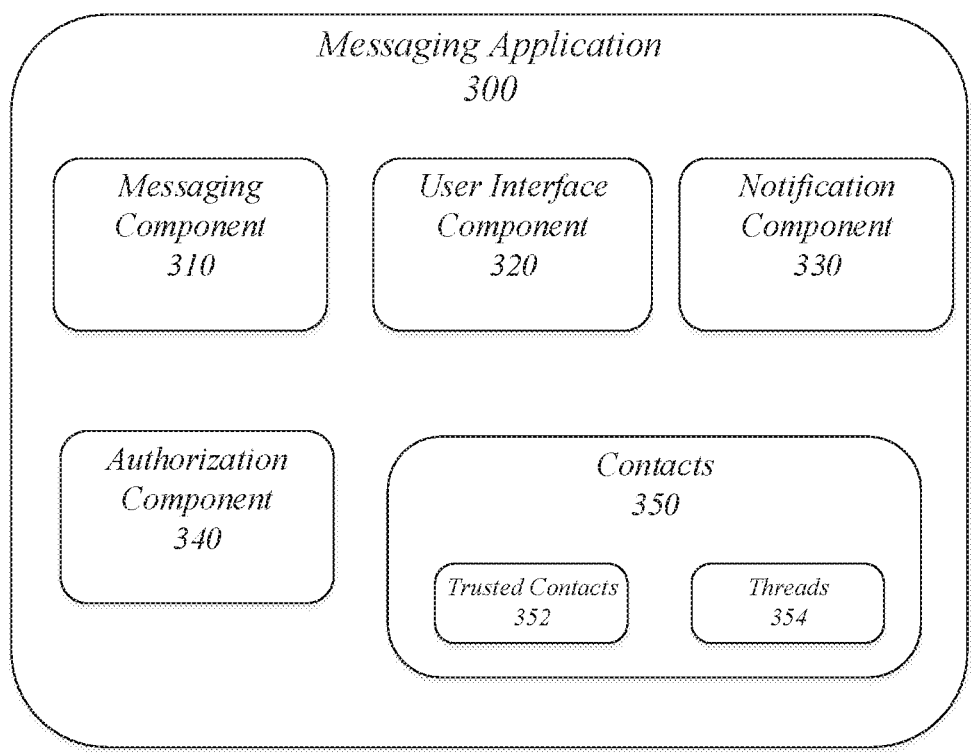
FIG. 3 illustrates an embodiment of a message application for the system of FIG. 1.

FIG. 3 illustrates an embodiment of a message application 300, which may be an embodiment of the message application 220. The message application 300 may include instructions that when executed by one or more processing circuits provide the functionality described herein. The instructions may be embodied in software, hardware, or combination of software and hardware. The message application may include one or more functional components, such as a messaging component 310, a user interface (UI) component 320, a notification component 330, and an authorization component 340. More, fewer, or alternate functional components may be used. In some embodiments, two or more functional components may be combined.

The messaging component 310 may generally receive messages sent from other devices, and may allow the user of the device to compose and send message to other devices. The messaging component 310 may receive a location request from another client device in a messaging conversation taking place between the messaging application 300 and the other client device.

The user interface (UI) component 320 may generally present user interface elements that allow the user to view messages, compose messages, set preferences, search for users or content, and other aspects of the messaging experience. The UI component 320 may present a dialog on the display in response to receiving a location request. The dialog may include an accept element and a decline element. The accept element may, when a control directive is received from the user, authorize a response to the location request that includes the location of the device.

The decline element, when selected by a control directive from the user, may cause a decline message to be sent to the other client device. The decline message does not include the location of the device but may indicate that the location request was declined. In some embodiments, no response may be sent to the other device when a control directive is received at the decline element. The UI component 320 may present a second dialog comprising a selectable time interval when the decline element is selected. The second dialog may allow the user to select a time interval. The time interval may correspond to a "do not disturb" time during which the user does not wish to receive any further location requests. The second dialog may send a do-not-disturb message to the other client device comprising the selected time interval.

In an embodiment, the UI component 320 may provide one or more selectable UI elements that allow the user of the message application 300 to select and authorize a particular message thread associated with a messaging conversation to receive location requests at the user's device. A message thread may correspond to a particular collection of messages, wherein at any particular point in time the message thread is associated with a particular group of users, such as a pair of users in a one-on-one thread or three or more users in a group thread. A location request sent to the authorized message thread may receive a location response from the device(s) receiving the location request. Authorizing a message thread may have a similar effect as authorizing a specific user. However, in some embodiments, a message thread may eventually expire or become inactive, and a location authorization associated with the expired or inactive message thread may also expire.

The notification component 330 may request a location from the location determination component 230 of the device when a location response is authorized. The location may be sent to the requesting client device. Authorization may be provided when a control directive is received at the accept element, or may be determined by the authorization component 340. In an embodiment, the notification component 330 may start a timer in response to receiving the location request when the requesting client device is authorized. When the timer expires, the notification component 330 may send the location to the requesting client device, even when no control directive is received at the dialog.

The message application 300 may store contacts 350 on the device where it is installed, or may have access to contact 350 at the messaging system 410. The contacts 350 may include information about the users of the messaging system 410 and/or the social networking system 420 with which the user of the messaging application 300 communicates. The information may include, for example, a name, a profile photo, an avatar image, and one or more endpoints for communication, such as phone number, an email address, a user name, a chat handle, a device network address, and so forth.

The contact 350 may include additional information, such as which contacts are trusted contacts 352. A trusted contact may be established, for example, by the user selecting a "trusted" setting on an individual contact, or by receiving a request to make another user a trusted user and responding affirmatively to that request.

The contacts 350 may also include information about which threads 354 a particular contact is a part. Each thread 354 may have a unique identifier and may be associated with the contacts in the thread.

The authorization component 340 may determine whether the client device is authorized to send a location request to the user of the message application 300. In an embodiment, the authorization component 340 may determine whether the requesting client device is authorized according to whether the requesting client device is a trusted contact of a user of the messaging application 300. In an embodiment, the authorization component 340 may determine whether the requesting client device is authorized according to an authorization associated with a message thread comprising the messaging application and the requesting client device. In an embodiment, the authorization component 340 may request authorization from the social networking system 420 as described below.

Figure 4:
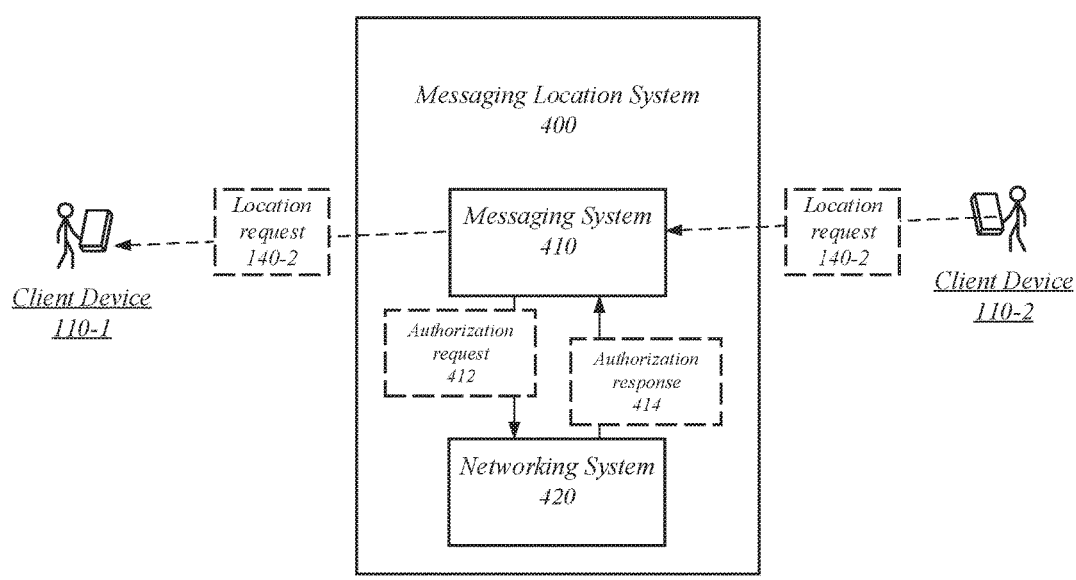
FIG. 4 illustrates an embodiment of a messaging server system for the system of FIG. 1.

FIG. 4 illustrates an embodiment of the messaging location system 400, which may be an embodiment of the messaging location system 120. The messaging location system 400 may include one or more subsystems, such as a messaging system 410 and a networking system 420. More, fewer, or alternate subsystems may be used. Each subsystem may be owned and operated by the same entity. In some embodiments, one or more of the subsystems may be owned and operated by a different entity from the other subsystems.

The messaging system 410 may provide the functions, operations and infrastructure to allow client devices 110 to send and receive messages to and from each other. The messages may contain text, images, video, links or addresses to network resources, audio recordings, files, and so forth. An exchange of messages may be between two users or among a group of users. An embodiment of the messaging system 410 is described in more detail with respect to FIG. 5.

The networking system 420 may enable one or more users (e.g., persons, businesses, and other entities) to interact with each other in the social networking system by providing social networking services to the one or more users. One type of networking system may be a social networking system. Each user of the networking system 420 may be associated with a user account in the networking system 420. Each user account may be represented by user account information. The user account information for each user may include, but is not limited to, user account identifier (e.g., phone number, email address, etc.), user account authentication token (e.g., user account password, physical and/or virtual security tokens, etc.), and/or any other information relevant to the authentication and authorization of each user. To ensure authorized access of each user, the networking system 420 may be further configured to authenticate each user based on at least a portion of the user account information (e.g., user account identifier, user account authentication token) provide by each user and received from one or more devices 110.

Each user account may be further associated with a user profile representative of a user's presence within the networking system 420. Each user profile associated with each user may be represented by user profile information, which may include, but is not limited to, user identifier information (e.g., a unique identifier that identifies the user and the user profile information), user biographic and/or demographic information, (e.g., user name information which may include, but is not limited to, a first, middle, and/or last name of the user, an entity name associated with the user, contact information of the user, birth date of the user), user profile media information (e.g., profile image(s) of the user, a focused user profile image of the user, etc.), user location information (e.g., the hometown location of the user, the current location of the user), user time zone information (e.g., time zone of the user, etc.), user social connections information (e.g., a list of friends, family members, coworkers, teammates, classmates, business associates, of the user), user groups membership information, user interest information (e.g., the interests listed by the user, movies listed by the user, music listed by the user, books listed by the user, approvals or "likes" of the user, or any other information that may identify the user's interest), user employment history information (e.g., list of current and/or past employers of the user), user social message information (e.g., one or more social networking messages where the user is a recipient), and/or any other preference/personal information associated with the user.

To provide users with one or more social networking services, the networking system 420 may store one or more social networking objects representative of the information received and provided by the networking system 420. Furthermore, the social networking objects of the networking system 420 may include, but is not limited to, events, user profiles, comments, activities (e.g., posts, polls, etc.), groups, media (e.g., images, videos, illustrated graphical objects, e.g., "Stickers," animated images, files, applications, etc.), or any other social networking object that may be received, stored, provided, or otherwise tracked and/or accessed by the networking system 420.

The networking system 420 may further store object connections between two or more objects. Furthermore, the object connections may be representative of the relationship or links between the two or more objects. The one or more social networking objects in conjunction with one or more object connections may form a message graph, a contacts graph, or a social graph comprising two or more nodes interconnected via one or more edges, where each node may be representative of a social networking object and each edge may be representative of the object connections between two or more social networking objects in the networking system 420.

The networking system 420 may also enable users to send and/or receive private social messages to one or more users by communicating the social message information comprising one or more private social messages to and from one or more users. The networking system 420 may use the messaging system 410 to enable the exchange of private social messages.

In an embodiment, the messaging system 410 may receive a location request 140-2 from a client device 110-2. The messaging system 410 may send an authorization request 412 to the networking system 420. The networking system 420 may determine whether the client device 110-2 and/or its associated sending user is authorized to send the location request to the client device 110-1 based on a relationship between the sending user and the recipient user of the client device 110-1. For example, when a social graph of the social network indicates only one edge between a node for the sending user and a node for the recipient user, e.g. a "friend" relationship, the location request may be authorized. In another embodiment, the location request may only be authorized if the edge between the sending recipient and the receiving recipient represents a trusted relationship, rather than a simple friendship connection. Other relationships may be defined in the social graph that authorize different levels of permission to send location requests or other information to a user. The networking system 420 may send an authorization response 414 back to the messaging system 410. The authorization response 414 may include authorization for the client device 110-2 to send the location request to the client device 110-1, or may deny the request. When the location request 140-2 is authorized, the messaging system 410 may deliver the location request 140-2 to the client device 110-1.

In some embodiments, the networking system 420 may be able to distribute information related to emergency events and determine which of its users may be affected by an emergency event, for example, due to location proximity to a disaster area. The networking system 420 may provide a mechanism for a user to mark themselves or their friends as being safe. The networking system 420 may, in some embodiments, act as a requesting user and send location requests to users determined to be affected by the emergency event via the messaging system 410. The networking system 420 may not be authorized as a trusted friend, but may still cause the dialog to be presented to the receiving user. In other embodiments, the networking system 420 may be authorized to receive an automatic response to the location request if no input from the user is received. The location information may be sent to other users having a trusted relationship, even if those users did not send a location request.

Figure 5:
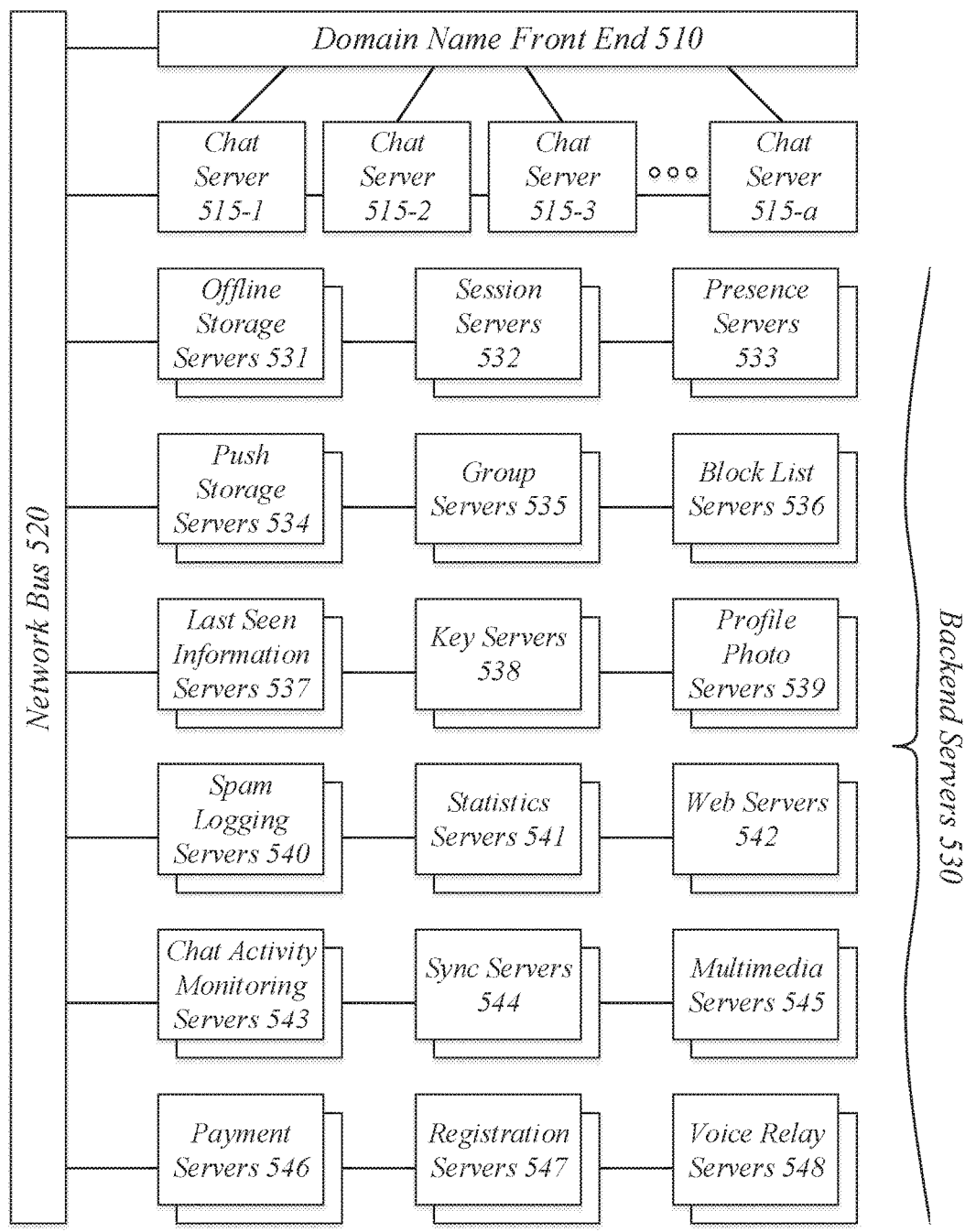
FIG. 5 illustrates an embodiment of a messaging system for the system of FIG. 1.

FIG. 5 illustrates an embodiment of a messaging system 500 for the system of FIG. 1. The messaging system 500 may be an embodiment of the messaging system 410. It will be appreciated that different distributions of work and functions may be used in various embodiments of a messaging system 500.

The messaging system 500 may comprise a domain name front end 510. The domain name front end 510 may be assigned one or more domain names associated with the messaging system 500 in a domain name system (DNS). The domain name front end 510 may receive incoming connections and distribute the connections to servers providing various messaging services.

The messaging system 500 may comprise one or more chat servers 515. The chat servers 515 may comprise front-end servers for receiving and transmitting user-to-user messaging updates such as chat messages. Incoming connections may be assigned to the chat servers 515 by the domain name front end 510 based on workload balancing.

The messaging system 500 may comprise backend servers 530. The backend servers 530 may perform specialized tasks in the support of the chat operations of the front-end chat servers 515. A plurality of different types of backend servers 530 may be used. It will be appreciated that the assignment of types of tasks to different backend serves 530 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 500 may comprise one or more offline storage servers 531. The one or more offline storage servers 531 may store messaging content for currently-offline messaging endpoints in hold for when the messaging endpoints reconnect.

The messaging system 500 may comprise one or more sessions servers 532. The one or more session servers 532 may maintain session state of connected messaging endpoints.

The messaging system 500 may comprise one or more presence servers 533. The one or more presence servers 533 may maintain presence information for the messaging system 500. Presence information may correspond to user-specific information indicating whether or not a given user has an online messaging endpoint and is available for chatting, has an online messaging endpoint but is currently away from it, does not have an online messaging endpoint, and any other presence state.

The messaging system 500 may comprise one or more push storage servers 534. The one or more push storage servers 534 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 500 may comprise one or more group servers 535. The one or more group servers 535 may maintain lists of groups, add users to groups, remove users from groups, and perform the reception, caching, and forwarding of group chat messages.

The messaging system 500 may comprise one or more block list servers 536. The one or more block list servers 536 may maintain user-specific block lists, the user-specific incoming-block lists indicating for each user the one or more other users that are forbidden from transmitting messages to that user. Alternatively or additionally, the one or more block list servers 536 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 500 may comprise one or more last seen information servers 537. The one or more last seen information servers 537 may receive, store, and maintain information indicating the last seen location, status, messaging endpoint, and other elements of a user's last seen connection to the messaging system 500.

The messaging system 500 may comprise one or more key servers 538. The one or more key servers may host public keys for public/private key encrypted communication.

The messaging system 500 may comprise one or more profile photo servers 539. The one or more profile photo servers 539 may store and make available for retrieval profile photos for the plurality of users of the messaging system 500.

The messaging system 500 may comprise one or more spam logging servers 540. The one or more spam logging servers 540 may log known and suspected spam (e.g., unwanted messages, particularly those of a promotional nature). The one or more spam logging servers 540 may be operative to analyze messages to determine whether they are spam and to perform punitive measures, in some embodiments, against suspected spammers (users that send spam messages).

The messaging system 500 may comprise one or more statistics servers 541. The one or more statistics servers may compile and store statistics information related to the operation of the messaging system 500 and the behavior of the users of the messaging system 500.

The messaging system 500 may comprise one or more web servers 542. The one or more web servers 542 may engage in hypertext transport protocol (HTTP) and hypertext transport protocol secure (HTTPS) connections with web browsers. The one or more web servers 542 may, in some embodiments, host the remote web server 350 as part of the operation of the messaging web access system 100.

The messaging system 500 may comprise one or more chat activity monitoring servers 543. The one or more chat activity monitoring servers 543 may monitor the chats of users to determine unauthorized or discouraged behavior by the users of the messaging system 500. The one or more chat activity monitoring servers 543 may work in cooperation with the spam logging servers 540 and block list servers 536, with the one or more chat activity monitoring servers 543 identifying spam or other discouraged behavior and providing spam information to the spam logging servers 540 and blocking information, where appropriate to the block list servers 536.

The messaging system 500 may comprise one or more sync servers 544. The one or more sync servers 544 may sync the messaging system 540 with contact information from a messaging endpoint, such as an address book on a mobile phone, to determine contacts for a user in the messaging system 500.

The messaging system 500 may comprise one or more multimedia servers 545. The one or more multimedia servers may store multimedia (e.g., images, video, audio) in transit between messaging endpoints, multimedia cached for offline endpoints, and may perform transcoding of multimedia.

The messaging system 500 may comprise one or more payment servers 546. The one or more payment servers 546 may process payments from users. The one or more payment servers 546 may connect to external third-party servers for the performance of payments.

The messaging system 500 may comprise one or more registration servers 547. The one or more registration servers 547 may register new users of the messaging system 500.

The messaging system 500 may comprise one or more voice relay servers 548. The one or more voice relay servers 548 may relay voice-over-internet-protocol (VoIP) voice communication between messaging endpoints for the performance of VoIP calls.

The messaging system 500 may include an authorization server (or other suitable component(s)) (not shown) that allows users to opt in to or opt out of having their actions logged by messaging system 500 or accessed by other systems, for example, by setting appropriate privacy settings. A privacy setting of a user may determine what information associated with the user may be logged or accessed, how information associated with the user may be logged or accessed, when information associated with the user may be logged or accessed, who may log or access information associated with the user, with whom information associated with the user may be shared, and for what purposes information associated with the user may be logged or accessed. Authorization servers or other authorization components may be used to enforce one or more privacy settings of the users of messaging system 500 and other elements of a social-networking system through blocking, data hashing, anonymization, or other suitable techniques as appropriate.

In some embodiments, a messaging thread may span several different devices, for example, a user's mobile telephone device, a tablet device, a laptop computer and a desktop computer. When a location request is received for a user, the messaging system 500 may use information about the user's last seen device and send the location request to that device. In other embodiments, the location request may be sent to some or all of the user's devices on which the message thread took place, for example, if no activity on any of the user's devices has been detected for some period of time, or if a message session has expired.

Figure 6:
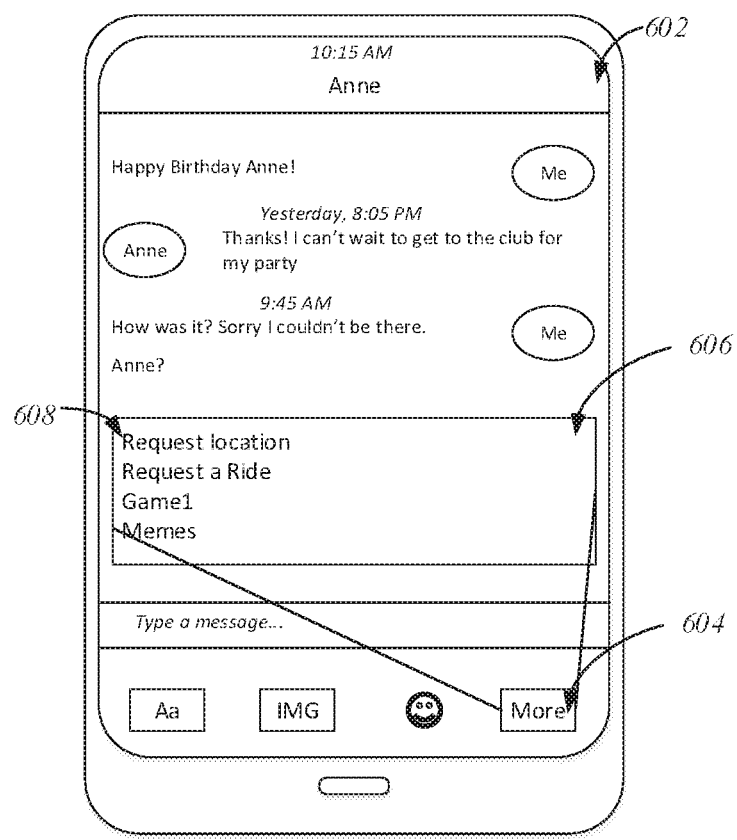
FIG. 6 illustrates an embodiment of a user interface for the system of FIG. 1.

FIG. 6 illustrates an embodiment of a user interface (UI) 600 for the system of FIG. 1. The UI 600 may be presented on a client device 602 within a UI for the message application 220, 300. As shown in FIG. 6, the user of client device 602 has sent messages to another user, "Anne", in a message thread associated with the user and Anne, and has received a message from Anne.

The UI 600 may provide a control element, e.g. the "more" button 604, that, when selected by a control directive, opens a menu 606 for additional operations in the message application 220, 300. One of the additional operations may be a request for a location 608. When selected by another control directive, the request location 608 will cause the message application 220, 300 to send a location request 130 to the other user in the messaging conversation, in this case, to "Anne."

Figure 7:
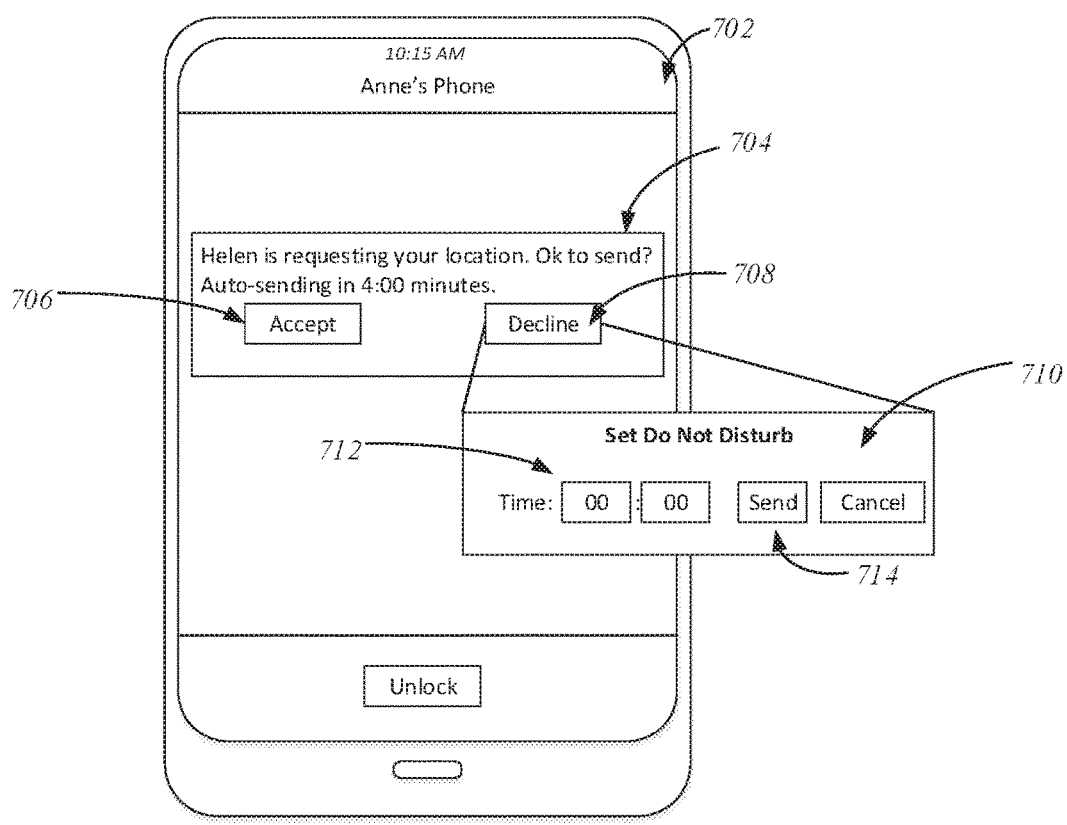
FIG. 7 illustrates an embodiment of a second user interface for the system of FIG. 1.

FIG. 7 illustrates an embodiment of a second user interface (UI) 700 for the system of FIG. 1. The UI 700 may be presented on a client device 702. Continuing from the example of FIG. 6, the client device 702 may belong to the user Anne. In particular the UI 700 may include a notification 704 that represents the location request 130 sent from the client device 602.

The notification 704 may be presented in the foreground or as an overlay to any application executing in the foreground of the client device 702. The notification 704 may be presented when the client device 702 is not in use, e.g. as an overlay to a lock screen.

The notification 704 may be a dialog that includes an accept element 706 and a decline element 708. When selected by a control directive, the accept element 706 may cause the client device 702, via the message application 220, 300, to send the location of the client device 702 to the requesting device, in this case, the client device 602.

When the decline element 708 is selected by a control directive, a decline message, or no message, may be sent back to the requesting device. In an embodiment, a second dialog 710 may be presented, for example, in place of the notification 704, overlaid on the notification 704 or in another location on the display of the client device 702. The second dialog 710 may provide a time interval element 712 that allows the user of the client device 702 to set a time, e.g. a number of hours and/or minutes, during which they do not wish to receive any further location requests. Once the time interval is set, the user may send the decline message including the time interval back to the requesting device by selecting the "send" control element 714.

Figure 8:
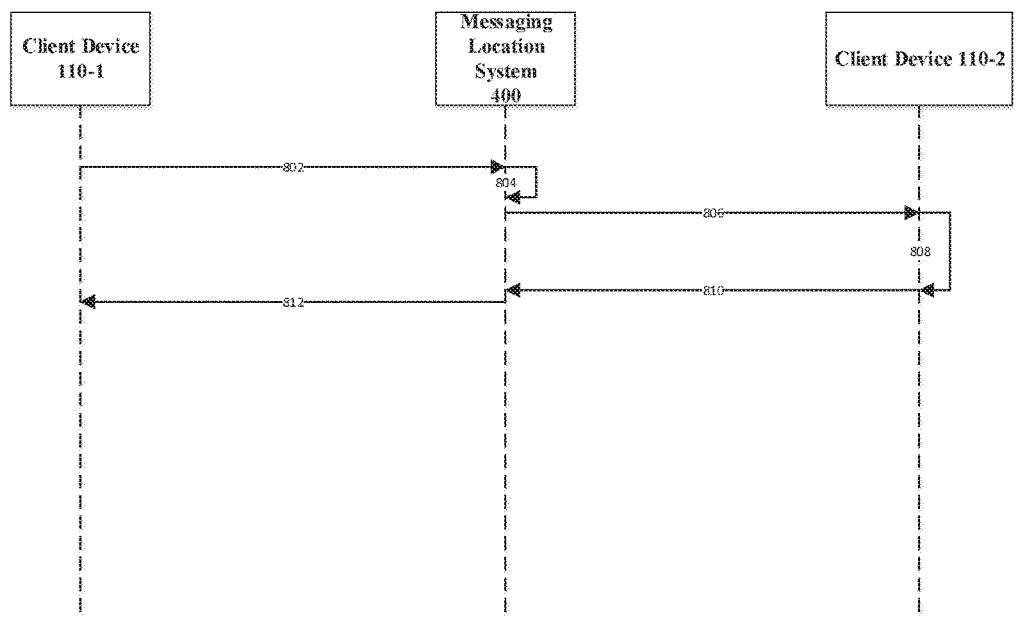
FIG. 8 illustrates an embodiment of a message flow for the system of FIG. 1
Figure 9:
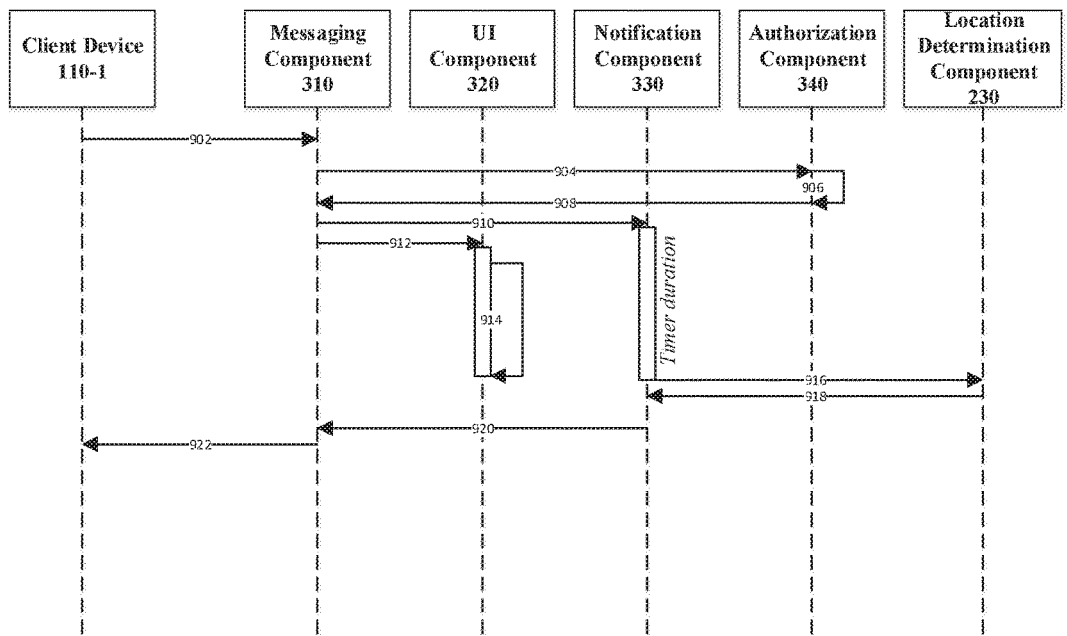
FIG. 9 illustrates an embodiment of a second message flow for the system of FIG. 1.

FIGS. 8-9 illustrate various message flows for the communication system 100. The message flows may represent messages communicated among the components of system 100. In the illustrated message flows, time flows from the top of the diagram toward the bottom; and a "message" may include data and/or instructions communicated from one component to another, as well as internal functions within a component.

FIG. 8 illustrates an embodiment of a message flow 800 for the communication system 100. The message flow 800 may represent messages communicated between two client devices 110-1, 110-2, via the messaging location system 400. In particular the message flow 800 may represent the messages communicated during a request for a location when authorization for the request is determined by a social networking system.

The message flow 800 begins when the client device 110-1 sends a location request to the user of the client device 110-2 via the messaging location system 400, in the message 802. The location request in the message 802 may be associated with a message thread that associates the messaging communications between the users of the client devices 110-1 and 110-2. The location request in the message 802 may have a format different from an interpersonal communication message. For example, the location request may contain a header but no message body, where the header contains an identifier that tells the messaging location system 400 that the message 802 is a location request rather than an interpersonal, human-readable message. The message 802 may also include a message thread identifier, an address or other endpoint for the user of the client device 110-2, an address or other identifier of the sending user, and so forth.

The message flow 800 continues when the messaging location system 400 determines whether the sending user of the client device 110-1 is authorized to send a location request to the client device 110-2, in the message 804. The messaging location system 400 may determine from a contacts graph or a social graph in the networking system 420 that the users of the client devices 110-1 and 110-2 have a type of relationship where a location request from one to the other is authorized. The type of relationship may include, for example, a first-degree or "friend" relationship, or a more specific "trusted friend" or "emergency contact" type of relationship.

The message flow 800 continues when the messaging location system 400 determines that the user of the client device 110-1 is authorized to send a location request to the client device 110-2 and forwards the location request from the message 802 to the client device 110-2, in the message 806. In an embodiment, if the user of the client device 110-1 is not authorized, the message flow may end. Alternatively, the message 806 may be sent, but the messaging location system 400 may alter the message 802 to add an indication that the user is not authorized by the message location system 400 to allow the recipient user to decide whether to grant the location request despite the lack of authorization.

The message flow 800 continues when the client device 110-2 presents a dialog about the location request, in the message 808. The message 808 may also include starting a timer. The dialog may inform the receiving user of the client device 110-2 that the sending user of the client device 110-1 is requesting the location of the receiving user, and may provide control elements that allow the receiving user to allow or decline to share their location.

The message flow 800 continues when the timer expires or when the receiving user chooses to share their location via the dialog (not shown), and the location of the client device 110-2 is sent to the messaging location system 400, in the message 810. The message 810 may include, for example, global positioning system (GPS) coordinates, a street address, a business or location name, or any other representation of the location of the client device 110-2 accessible to the location component 230.

The message flow 800 continues when the messaging location system 400 forwards the location information to the client device 110-1, in the message 812.

The messages 802, 806, 810 and 812 may all be sent as a part of a messaging conversation taking place between the client devices using the message application 220, 300. These messages may be part of, or otherwise associated with, a message thread that associates the users of the client devices 110-1 and 110-2.

FIG. 9 illustrates an embodiment of a message flow 900 for the system of FIG. 1. The message flow 900 may represent messages communicated among the components of the communication system 100. In particular, the message flow 900 may occur among the requesting client device 110-1 and the components of the message application 300 on the receiving client device, e.g. client device 110-2.

The message flow 900 begins when the client device 110-1 sends a location request to the receiving client device which is received by the messaging component 310, in the message 902. The message 902 may be similar or analogous to the message 802.

The message flow 900 continues when the messaging component 310 sends an authorization request to the authorization component 340, in the message 904. The authorization request in the message 904 may include the location request itself and/or information identifying the sending user.

The message flow 900 continues when the authorization component 340 determines whether the sending user is authorized to send a location request, in the message 906. The authorization component 340 may, for example, examine the message thread 354 to determine if the thread is authorized, or may examine the contacts 350 of the receiving user to determine if the sending user is a trusted contact 352.

The message flow 900 continues when the authorization component 340 sends an authorization response to the messaging component 310, in the message 908. In the illustrated example, the sending user is authorized to send a location request to the receiving user's device.

The message flow 900 continues when the messaging component 310 sends a request to the notification component 330 to start a timer, in the message 910. The messaging component 310 may also send a request to the UI component 320 to present a dialog, in the message 912. In an embodiment, the messages 910 and 912 may be sent in parallel, or substantially simultaneously is sequence.

The message flow 900 continues when the UI component 320 presents the location request dialog, in the message 914. The location request dialog may be presented for the duration of the time, or until a control directive is received by the recipient user.

The message flow 900 continues when the timer expires and the notification component 330 requests the location of the device from the location determination component 230, in the message 916.

The message flow 900 continues when the location determination component 230 returns the location, in the message 918. The message 918 may include, for example, global positioning system (GPS) coordinates, a street address, a business or location name, or any other representation of the location accessible to the location component 230.

The message flow 900 continues when the notification component 330 sends the location to the messaging component 310, in the message 920. The message 920 may be the same as the message 918.

The message flow 900 continues when the messaging component 310 sends the location response to the requesting client device 110-1, in the message 922.

When the client device 110-1 receives the location information, the location may be presented (not shown) in various ways on the display of the device. For example, the location information (coordinates, address, location name) may be presented in text form. In an embodiment, the location information may be presented visually, for example in a map view within the message application 300, or in a separate map application on the device.

Figure 10:
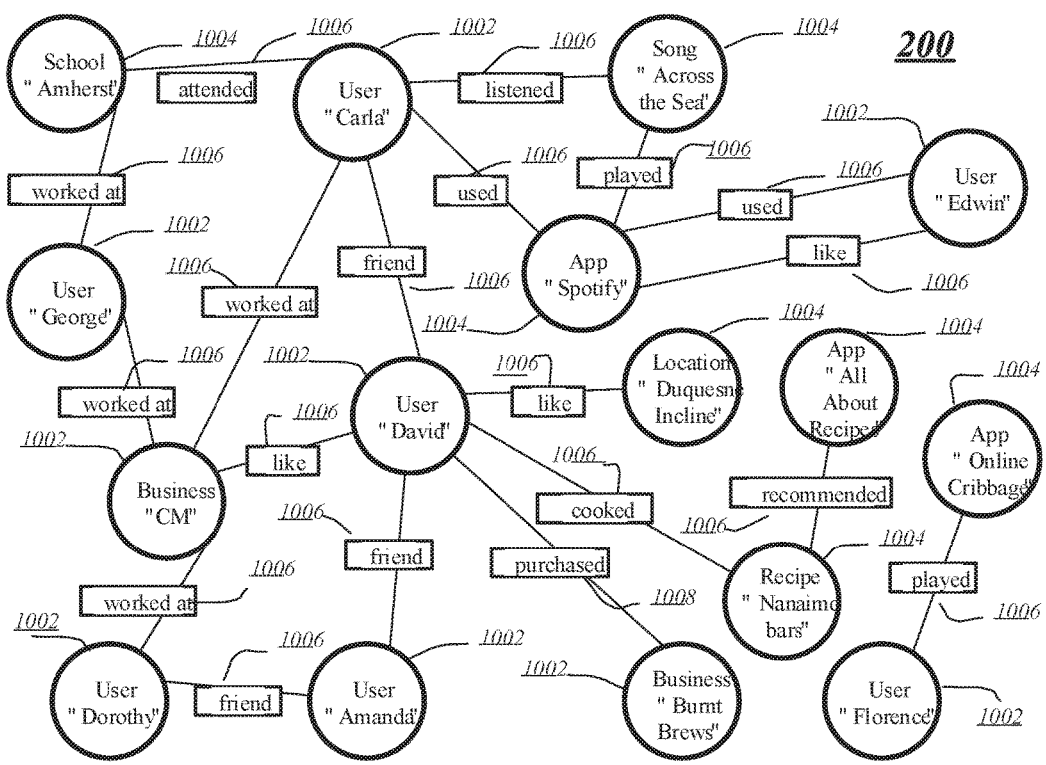
FIG. 10 illustrates a diagram of a social graph for the system of FIG. 1.

FIG. 10 illustrates an example of a social graph 1000. In particular embodiments, a social-networking system such as networking system 420 may store one or more social graphs 1000 in one or more data stores as a social graph data structure.

In particular embodiments, social graph 1000 may include multiple nodes, which may include multiple user nodes 1002 and multiple concept nodes 1004. Social graph 1000 may include multiple edges 1006 connecting the nodes. In particular embodiments, a social-networking system, client system, third-party system, or any other system or device may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of the social-networking system who may also or alternatively be a user of a messaging system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with the social-networking system. In particular embodiments, a user node 1002 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages. A user node 1002 may be associated with a unique user identifier for the user in the social-networking system.

In particular embodiments, a concept node 1004 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, government agency, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. A business page may comprise a user-profile page for a commerce entity. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 1006 connecting the first user's user node 1002 to the second user's user node 1002 in social graph 1000 and store edge 1006 as social-graph information in one or more data stores. In a similar manner, a first user may indicate that a second user is a "trusted friend" of the first user. In response to this indication, the social-networking system may send a "trusted friend request" to the second user. If the second user confirms the "trusted friend request," the social-networking system may create an edge 1006 connecting the first user's user node 1002 to the second user's user node 1002 in social graph 1000 and store edge 1006 as social-graph information in one or more data stores. A "trusted friend" edge between two nodes may cause the social network system to authorize a location request from one of the two nodes to the other of the two nodes.

In the example of FIG. 10, social graph 1000 includes an edge 1006 indicating a friend relation between user nodes 1002 of user "Amanda" and user "Dorothy." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, the social-networking system may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Across the Sea"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "Edwin" and concept node 1004 for "SPOTIFY").

In particular embodiments, the social-networking system may create an edge 1006 between a user node 1002 and a concept node 1004 in social graph 1000. As an example and not by way of limitation, a user viewing a concept-profile page (such as, for example, by using a web browser or a special-purpose application hosted by the user's client system) may indicate that he or she likes the concept represented by the concept node 1004 by clicking or selecting a "Like" icon, which may cause the user's client system to send to the social-networking system a message indicating the user's liking of the concept associated with the concept-profile page. In response to the message, the social-networking system may create an edge 1006 between user node 1002 associated with the user and concept node 1004, as illustrated by "like" edge 1006 between the user and concept node 1004. In particular embodiments, the social-networking system may store an edge 1006 in one or more data stores. In particular embodiments, an edge 1006 may be automatically formed by the social-networking system in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Figure 11:
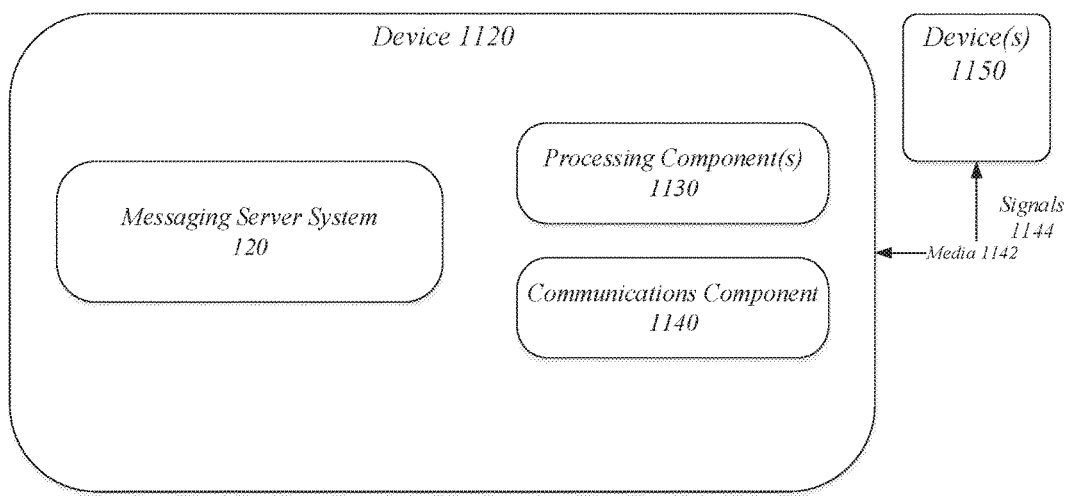
FIG. 11 illustrates a diagram of a centralized system for the system of FIG. 1.

FIG. 11 illustrates a centralized system 1100. The centralized system 1100 may implement some or all of the structure and/or operations for the system 100 for securing delivery of an animated message in a single computing entity, such as entirely within a single device 1120.

The device 1120 may comprise any electronic device capable of receiving, processing, and sending information, and may be an embodiment of a computing device. Examples of an electronic device may include without limitation an ultra-client device, a client device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1120 may execute processing operations or logic for the system 100 using a processing component 1130. The processing component 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1120 may execute communications operations or logic for the system 100 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1142 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1120 may communicate with other devices 1150 over a communications media 1142 using communications signals 1144 via the communications component 1140. The devices 1150 may be internal or external to the device 1120 as desired for a given implementation.

The device 1120 may include within it the messaging location system 120. Device 1120 may be operative to carry out the tasks of these elements using processing component 1130 and communications component 1140. Devices 1150 may comprise any of devices 110 or 200, the signals 1144 over media 1142 comprising the interactions between the device 1120 and its elements and these respective devices.

Figure 12:
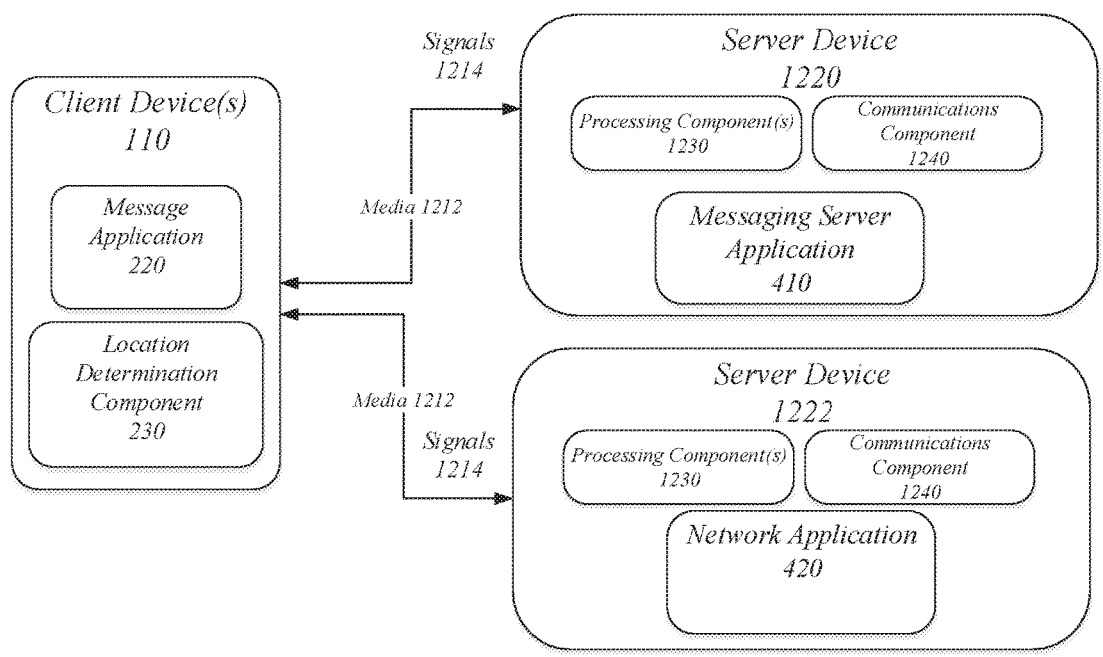
FIG. 12 illustrates a diagram of a distributed system for the system of FIG. 1.

FIG. 12 illustrates an embodiment of a distributed system 1200. The distributed system 1200 may distribute portions of the structure and/or operations for the system 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise one or more server devices, such as a server device 1220, server device 1222, and a server device 1224. In general, the server devices 1220, 1222, and 1224 may be similar to the device 1120 as described with reference to FIG. 11. For instance, the server devices 1220 and 1222 may comprise a processing component 1230 and a communications component 1240, which are the same or similar to the processing component 1130 and the communications component 1140, respectively, as described with reference to FIG. 11. In another example, server devices 1220, 1222, and 1224 may communicate over a communications media 1212 using their respective communications signals 1214 via the communications components 1240.

The server device 1220 may comprise or employ one or more server programs that operate to perform various methodologies in accordance with the described embodiments. For example, server device 1220 may implement the messaging server application 410. The server device 1222 may comprise or employ one or more server programs that operate to perform various methodologies in accordance with the described embodiments. For example, server device 1222 may implement an application for the networking system 420. The server device 1224 may comprise or employ one or more server programs that operate to perform various methodologies in accordance with the described embodiments. For example, server device 1224 may implement augmentation system 230. It will be appreciated a server device 1220, 1222, or 1224—or any of the server devices discussed herein—may itself comprise multiple servers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 13:
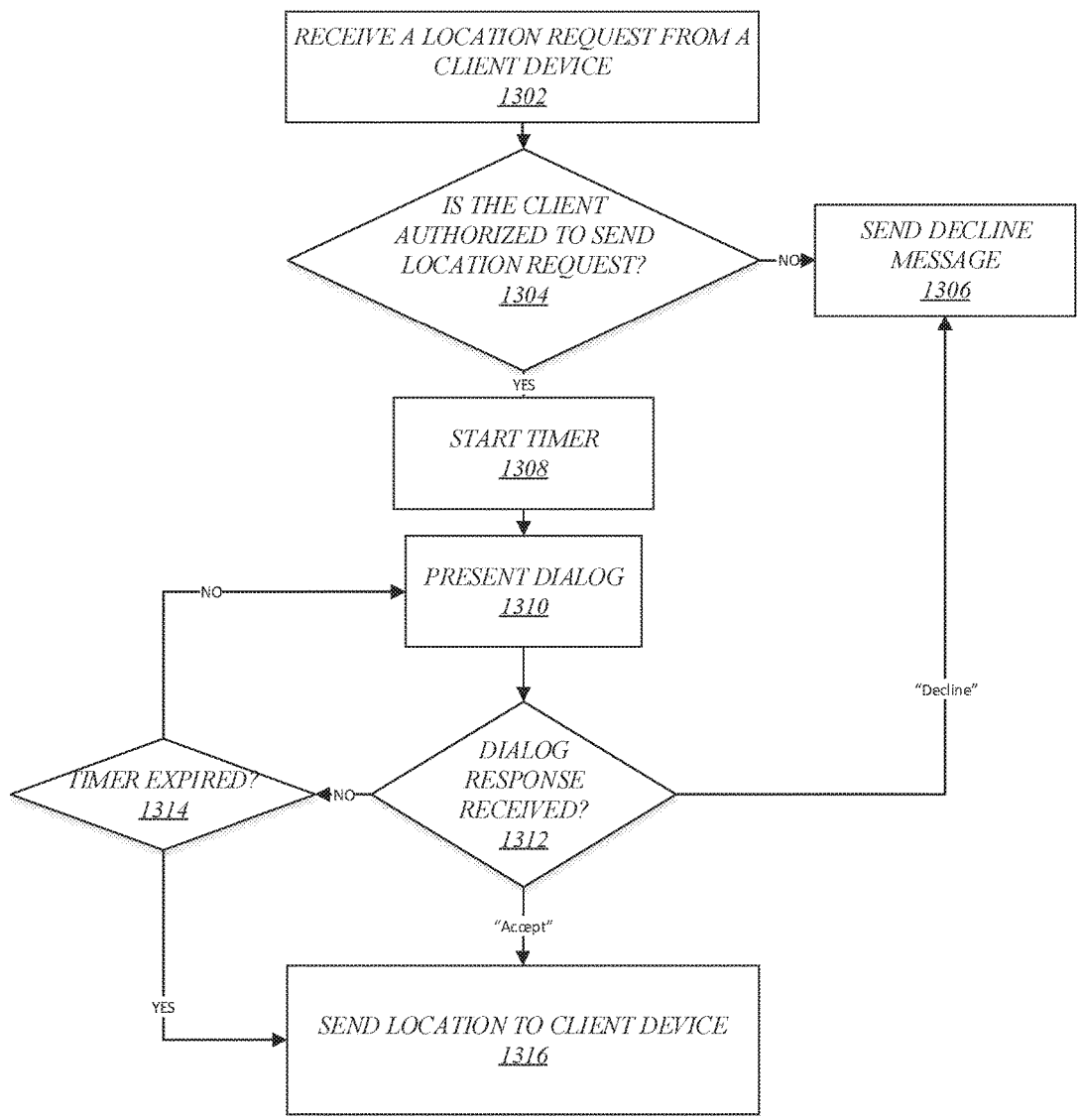
FIG. 13 illustrates an embodiment of a logic flow for the system of FIG. 1.

FIG. 13 illustrates an embodiment of a logic flow 1300 for the system 100. The logic flow 1300 may be representative of some or all of the operations executed by one or more embodiments described herein. The operations of the logic flow 1300 may be performed by a receiving client device 110 when a location request 130, 140 is received.

In the illustrated embodiment shown in FIG. 13, the logic flow 1300 may be operative to receive a location request from a requesting client device at block 1302. For example, the message application 300 may receive the location request associated with a message thread.

The logic flow 1300 may be operative to determine whether the requesting client is authorized to send the location request to the receiving client device at block 1304. For example, the message application 300 may determine whether the request is authorized on the receiving client device, or may request authorization from a networking system 420.

The logic flow 1300 may be operative to send a decline message at block 1306 when the requesting client is not authorized to send the location request. The decline message may serve to notify the requesting client that the location request was received, but that no location information will be shared, in order to prevent subsequent requests. The requesting client device may present a notification to the user that the request was declined.

The logic flow 1300 may be operative to start a timer at block 1308. For example, the message application 300 may start a user-defined timer, or a default timer to await a response to the location request.

The logic flow 1300 may be operative to present a dialog at block 1310. For example, the message application may present the dialog 704 on the display of the receiving client device. Blocks 1308 and 1310 may occur in sequence, in a different order than shown, or in parallel.

The logic flow 1300 may be operative to determine if a dialog response has been received at bock 1312. For example, the message application 300 may wait for a control directive on the dialog control elements.

If no response has been received, the logic flow 1300 may determine whether the timer has expired at block 1314. If the timer has not expired and no response has been received, the logic flow 1300 may continue presenting the dialog at block 1310.

If an "accept" response is received, or when the timer expires, the logic flow 1300 may send the location to the requesting device at block 1316.

If a "decline" response is received, the logic flow 1300 may send a decline message at block 1306.

Figure 14:
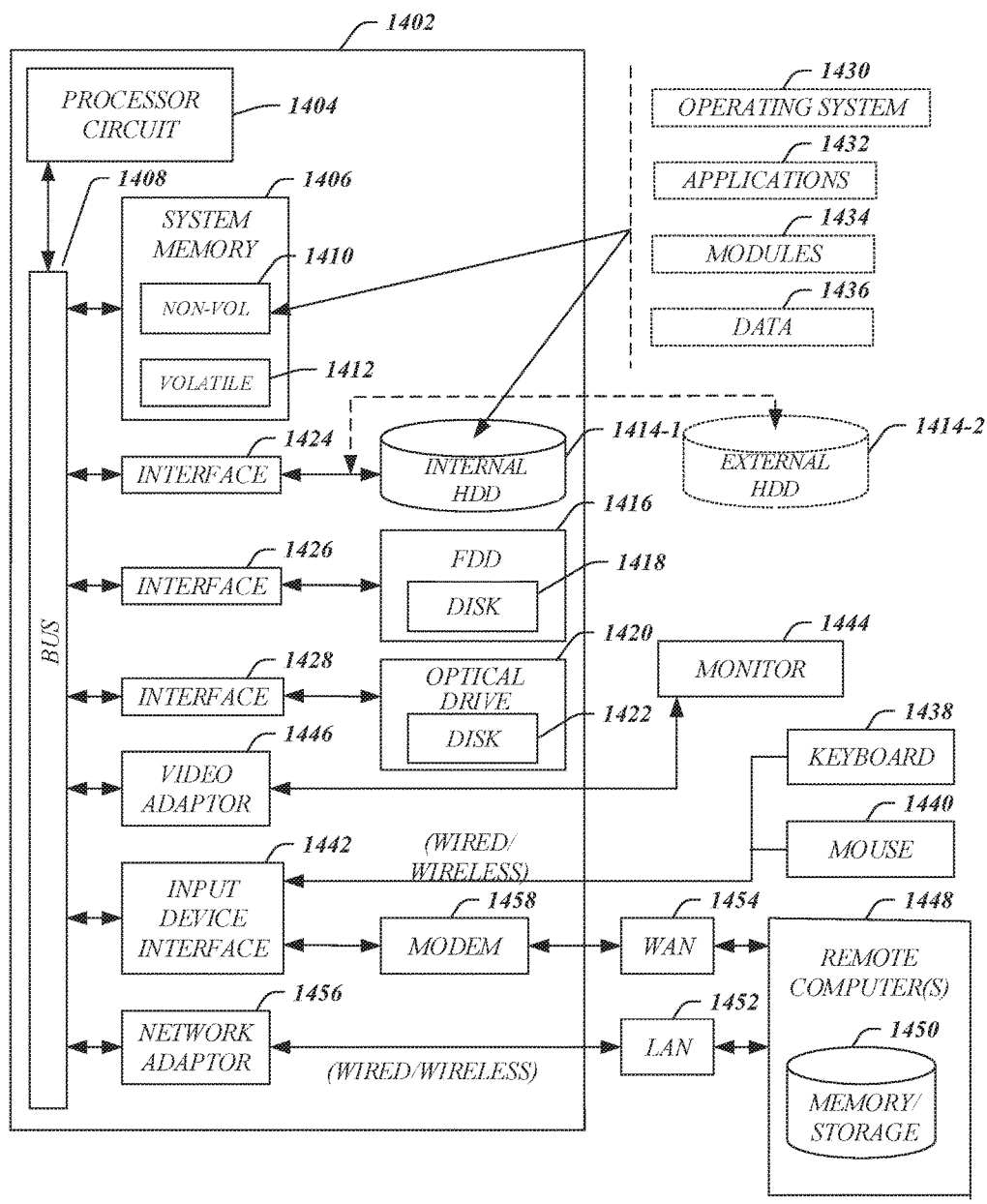
FIG. 14 illustrates an embodiment of a computing architecture.

FIG. 14 illustrates an embodiment of an exemplary computing architecture 1400 suitable for implementing various embodiments as previously described. In one embodiment, the computing architecture 1400 may comprise or be implemented as part of an electronic device. Examples of an electronic device may include those described with reference to FIGS. 11-12, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, the computing architecture 1400 comprises a processing circuit 1404, a system memory 1406 and a system bus 1408. The processing circuit 1404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors.

Dual microprocessors, multi-core processors, and other multi-processor architectures may also be employed as the processing circuit 1404.

The system bus 1408 provides an interface for system components including, but not limited to, the system memory 1406 to the processing circuit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414-1 and 1414-2, respectively, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436. In one embodiment, the one or more application programs 1432, other program modules 1434, and program data 1436 can include, for example, the various applications and/or components of the message application 220, 300; the messaging server application 410; and/or the social network application 420.

An operator can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing circuit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers, and so forth.

The computer 1402 may operate in a networked environment using logical connections via wired and/or wireless communications to one or more remote computers, such as a remote computer 1448. The remote computer 1448 can be a workstation, a server computer, a router, a personal computer, a portable computer, a microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wired and/or wireless communication network interface or adaptor 1456. The adaptor 1456 can facilitate wired and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
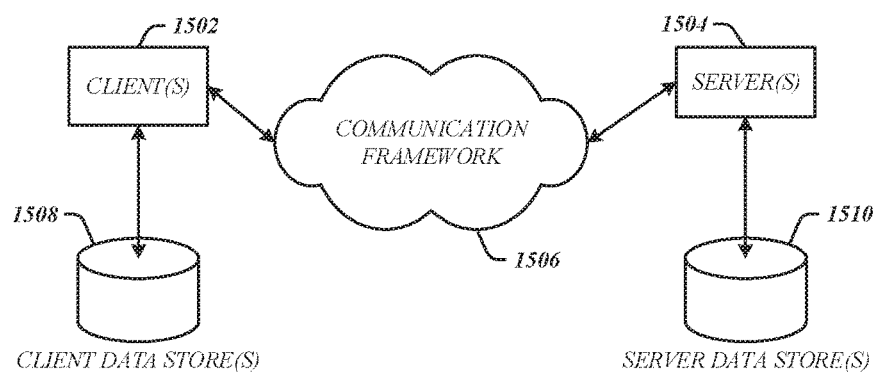
FIG. 15 illustrates an embodiment of a communications architecture.

FIG. 15 illustrates a block diagram of an exemplary architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to this implementation by the communications architecture 1500.

As shown in FIG. 15, the communications architecture 1500 comprises one or more clients 1502 and servers 1504. The clients 1502 may implement the devices 110, 200. The servers 1504 may implement the server devices 1120, 1220, 1222. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 may communicate information among each other using a communication framework 1506. The communications framework 1506 may implement any well-known communications techniques and protocols. The communications framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1502 and the servers 1504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 16:
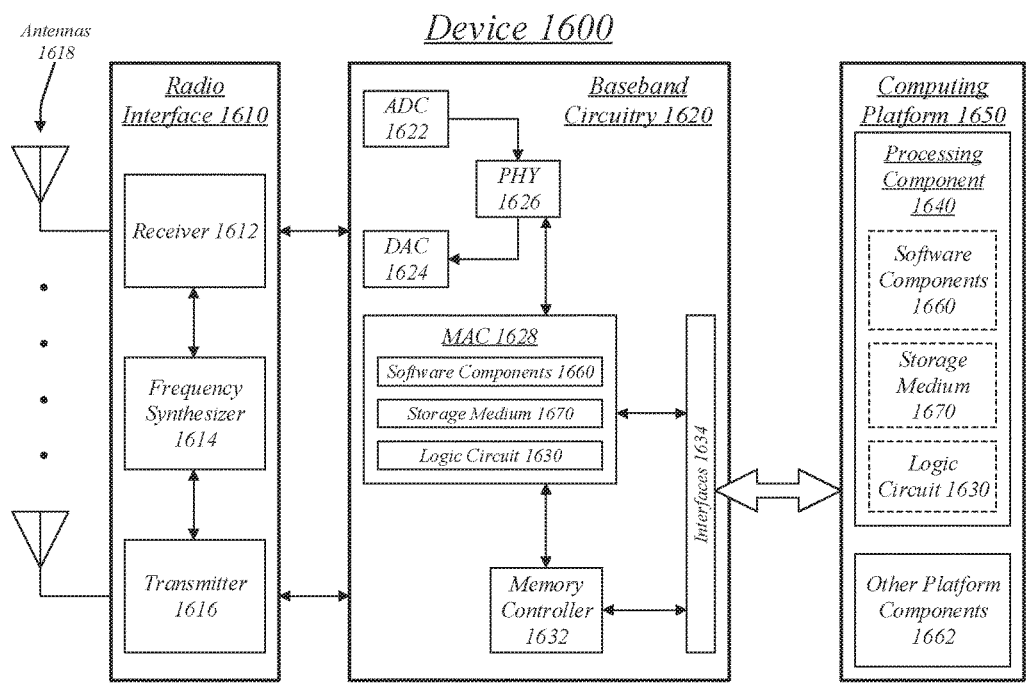
FIG. 16 illustrates an embodiment of a device for use in a multicarrier OFDM system.

FIG. 16 illustrates an embodiment of a device 1600 for use in a multicarrier OFDM system, such as in the communication system 100. Device 1600 may implement, for example, software components 1660 as described with reference to client device 110, 300 and/or a logic circuit 1630. The logic circuit 1630 may include physical circuits to perform operations described for the client device 110, 300. As shown in FIG. 16, device 1600 may include a radio interface 1610, baseband circuitry 1620, and computing platform 1650, although embodiments are not limited to this configuration.

The device 1600 may implement some or all of the structure and/or operations for the client device 110, 300 and/or logic circuit 1630 in a single computing entity, such as entirely within a single device. Alternatively, the device 1600 may distribute portions of the structure and/or operations for the client device 110, 300 and/or logic circuit 1630 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1610 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1610 may include, for example, a receiver 1612, a transmitter 1616 and/or a frequency synthesizer 1614. Radio interface 1610 may include bias controls, a crystal oscillator and/or one or more antennas 1618. In another embodiment, radio interface 1610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1620 may communicate with radio interface 1610 to process, receive and/or transmit signals and may include, for example, an analog-to-digital converter 1622 for down converting received signals, a digital-to-analog converter 1624 for up converting signals for transmission. Further, baseband circuitry 1620 may include a baseband or physical layer (PHY) processing circuit 1626 for PHY link layer processing of respective receive/transmit signals. Baseband circuitry 1620 may include, for example, a processing circuit 1628 for medium access control (MAC)/data link layer processing. Baseband circuitry 1620 may include a memory controller 1632 for communicating with processing circuit 1628 and/or a computing platform 1650, for example, via one or more interfaces 1634.

In some embodiments, PHY processing circuit 1626 may include a frame construction and/or detection module, in combination with additional circuitry such as a buffer memory, to construct and/or deconstruct communication frames, such as radio frames. Alternatively or in addition, MAC processing circuit 1628 may share processing for certain of these functions or perform these processes independent of PHY processing circuit 1626. In some embodiments, MAC and PHY processing may be integrated into a single circuit.

The computing platform 1650 may provide computing functionality for the device 1600. As shown, the computing platform 1650 may include a processing component 1640. In addition to, or alternatively, the baseband circuitry 1620, the device 1600 may execute processing operations or logic for the client device 110, 500 and logic circuit 1630 using the processing component 1640. The processing component 1640 (and/or PHY 1626 and/or MAC 1628) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1650 may further include other platform components 1662. Other platform components 1662 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth.

The computing platform 1650 and the baseband circuitry 1620 may further include one or memory units in the form of storage medium 1670. Examples of memory units may include, without limitation. various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1600 may be, for example, an ultra-client device, a client device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1600 described herein, may be included or omitted in various embodiments of device 1600, as suitably desired. In some embodiments, device 1600 may be configured to be compatible with protocols and frequencies associated one or more of the 3GPP LTE Specifications and/or IEEE 802.16 standards for WMANs, and/or other broadband wireless networks, cited herein, although the embodiments are not limited in this respect.

Embodiments of device 1600 may be implemented using single input single output (SISO) architectures. However, certain implementations may include multiple antennas (e.g., antennas 1618) for transmission and/or reception using adaptive antenna techniques for beamforming or spatial division multiple access (SDMA) and/or using MIMO communication techniques.

The components and features of device 1600 may be implemented using any combination of discrete circuitry, application specific integrated circuits (ASICs), logic gates and/or single chip architectures. Further, the features of device 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Accordingly, embodiments include methods, apparatuses, and computer-readable storage media for sharing a device location via a messaging system. A computer-implemented method may include receiving, in a messaging client executing on a first client device, a location request from a second client device; determining whether the second client device is authorized to send a location request to the first client device; starting a timer in response to receiving the location request when the second client device is authorized; and sending a location of the first client device to the second client device when the timer expires.

The method may include presenting a dialog on the first client device in response to receiving the request, the dialog comprising an accept element and a decline element. The method may include receiving a control directive at the accept element; and sending the location of the first client device to the second client device in response to receiving control directive at the accept element. The method may include receiving a control directive at the decline element; and sending a decline message to the second client device. The method may include presenting a second dialog comprising a selectable time interval; receiving a selection of a time interval; and sending a do-not-disturb message to the second client device comprising the time interval.

The method may include determining whether the second client device is authorized according to a social graph comprising a first node for a first user of the first client device and a second node for a second user of the second client device. The method may include determining whether the second client device is authorized according to whether the second client device is a trusted contact on the first client device. The method may include determining whether the second client device is authorized according to an authorization associated with a message thread comprising the first client device and the second client device.

The method may include receiving the location request in a messaging conversation between the first client device and the second client device. The method may include receiving a control directive at the first client device to authorize a message thread associated with the messaging conversation to receive location information from the first client device.

An apparatus may include a processor circuit; a display; a location determination component communicatively coupled to the processor circuit; and a messaging application executing on the processor circuit.

The messaging application may include: a messaging component to receive a location request from a client device in a messaging conversation between the messaging application and the client device; a user interface component to present a dialog on the display in response to receiving the location request, the dialog comprising an accept element and a decline element; and a notification component to request a location from the location determination component, and to send the location to the client device when a control directive is received at the accept element.

The messaging application may include an authorization component to determine whether the client device is authorized to send a location request to the apparatus. The notification component may start a timer in response to receiving the location request when the client device is authorized, and to send the location to the client device when the timer expires and no control directive is received at the dialog.

The authorization component may determine whether the client device is authorized according to a social graph comprising a first node for a first user of the messaging application and a second node for a second user of the client device. The authorization component may determine whether the client device is authorized according to whether the client device is a trusted contact of a user of the messaging application. The authorization component may determine whether the client device is authorized according to an authorization associated with a message thread comprising the messaging application and the client device.

The user interface component may receive a control directive at the decline element; and send a decline message to the client device. The user interface component may present a second dialog comprising a selectable time interval, receive a selection of a time interval, and send a do-not-disturb message to the client device comprising the time interval.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
receiving, in a messaging client executing on a first client device, a location request from a second client device requesting a location of the first client device;
determining whether the second client device is authorized to receive the location of the first client device, the second client device being automatically authorized to receive the location when a user of the second client device and a user of the first client device are both participants in a common messaging thread;

starting a timer in response to receiving the location request when the second client device is authorized; and sending the location of the first client device to the second client device when the timer expires.

2. The method of claim 1, comprising:

presenting a dialog on the first client device in response to receiving the request, the dialog comprising an accept element and a decline element.

3. The method of claim 2, comprising:

receiving a control directive at the accept element; and sending the location of the first client device to the second client device in response to receiving a control directive at the accept element.

4. The method of claim 1, wherein the second client device may also be authorized to receive the location of the first client device if the user of the second client device is a trusted contact on the first client device.

5. The method of claim 1, comprising:

receiving the location request in a messaging conversation between the first client device and the second client device.

6. The method of claim 1 wherein the second client device may also be authorized to receive the location of the first client device when it is determined that the user of the first client device and the user of the second client device have a relationship defined within a social graph.

7. An apparatus, comprising:

a processor circuit;

a display;

a location determination component communicatively coupled to the processor circuit;

a messaging application active on a first client device and executing on the processor circuit, the messaging application comprising:

a messaging component to receive a location request from a second client device in a messaging conversation between the first client device and the second client device, the location request requesting a location of the first client device;

an authorization component to determine whether the second client device is authorized to receive the location of the first client device, the second client device being automatically authorized to receive the location when a user of the second client device and a user of the first client device are both participants in a common messaging thread;

a user interface component to present a dialog on the display in response to receiving the location request, the dialog comprising an accept element and a decline element; and a notification component to request the location of the first client device from the location determination component, and to send the location to the second client device when a control directive is received at the accept element.

8. The apparatus of claim 7, the messaging application comprising:

the notification component to start a timer in response to receiving the location request when the second client device is authorized, and to send the location to the second client device when the timer expires and no control directive has been received at the dialog.

9. The apparatus of claim 8, wherein the second client device may also be authorized to receive the location of the first client device if the user of the second client device is a trusted contact of a user of the first client device.

10. The apparatus of claim 7, the user interface component to receive a control directive at the decline element and to send a decline message to the second client device.

11. The apparatus of claim 10, the user interface component to present a second dialog comprising a selectable time interval, to receive a selection of a time interval, and to send a do-not-disturb message to the second client device comprising the time interval.

12. The apparatus of claim 7 wherein the second client device may also be authorized to receive the location of the first client device when it is determined that the user of the first client device and the user of the second client device have a relationship defined within a social graph.

13. At least one non-transitory computer-readable storage medium comprising instructions that, when executed, cause a system to:

receive, in a messaging client executing on a first client device, a location request from a second client device requesting a location of the first client device;

determine whether the second client device is authorized to receive the location of the first client device, the second client device being automatically authorized to receive the location when a user of the second client device and a user of the first client device are both participants in a common messaging thread;

start a timer in response to receiving the location request when the second client device is authorized;

present a dialog on a display of the first client device in response to receiving the location request, the dialog comprising an accept element and a decline element, and send the location of the first client device to the second client device when the timer expires or a control directive is received at the accept element.

14. The at least one non-transitory computer-readable storage medium of claim 13 comprising instructions that, when executed, cause the system to:

send the location of the first client device to the second client device in response to receiving a control directive at the accept element before the timer expires.

15. The at least one non-transitory computer-readable storage medium of claim 13 comprising instructions that, when executed, cause the system to:

receive a control directive at the decline element; and send a decline message to the second client device.

16. The at least one non-transitory computer-readable storage medium of claim 15 comprising instructions that, when executed, cause the system to:

present a second dialog comprising a selectable time interval;

receive a selection of a time interval; and send a do-not-disturb message to the second client device comprising the time interval.

17. The at least one non-transitory computer-readable storage medium of claim 13 comprising instructions that, when executed, cause the system to:

determine that the second client device may also be authorized to receive the location of the first client device if the user of the second client device is a trusted contact on the first client device.

18. The non-transitory computer-readable storage medium claim 13 comprising further instructions that, when executed, cause the system to determine that the second client device may also be authorized to receive the location of the first client device when it is determined that the user of the first client device and the user of the second client device have a relationship defined within a social graph.

* * * * *